(12) United States Patent
Wollenweber

(10) Patent No.: US 6,877,901 B2
(45) Date of Patent: Apr. 12, 2005

(54) BEARING SYSTEM FOR HIGH-SPEED ROTATING MACHINERY

(76) Inventor: William E. Wollenweber, 3169 Camino del Arco, Carlsbad, CA (US) 92009-7856

( * ) Notice: Subject to any disclaimer, the term of this patent is extended or adjusted under 35 U.S.C. 154(b) by 178 days.

(21) Appl. No.: 10/369,801

(22) Filed: Feb. 20, 2003

(65) Prior Publication Data

US 2003/0123768 A1 Jul. 3, 2003

Related U.S. Application Data

(63) Continuation-in-part of application No. 09/978,935, filed on Oct. 16, 2001, now abandoned.

(51) Int. Cl.$^7$ .............................................. F16C 21/00
(52) U.S. Cl. .......................... 384/99; 384/535; 384/901
(58) Field of Search .......................... 384/99, 490, 512, 384/535, 901, 504, 513, 492; 417/407

(56) References Cited

U.S. PATENT DOCUMENTS

| | | | |
|---|---|---|---|
| 2,534,142 A | * 12/1950 | Morton et al. ............... | 384/535 |
| 3,056,634 A | 10/1962 | Wollenweber, Jr. et al. | |
| 3,061,386 A | * 10/1962 | Dix et al. ..................... | 384/535 |
| 3,096,126 A | 7/1963 | Wollenweber, Jr. et al. | |
| 3,258,199 A | 6/1966 | Anderson | |
| 3,390,926 A | 7/1968 | Wollenweber, Jr. | |
| 3,993,370 A | 11/1976 | Woollenweber | |
| 4,364,717 A | 12/1982 | Schippers et al. | |
| 4,370,106 A | * 1/1983 | Lauterbach ................. | 384/445 |
| 4,641,977 A | 2/1987 | Woollenweber | |
| 4,789,253 A | * 12/1988 | Perego ........................ | 384/517 |
| 4,808,091 A | * 2/1989 | Ruetz .......................... | 384/556 |

FOREIGN PATENT DOCUMENTS

SU 767471 11/1978

* cited by examiner

Primary Examiner—Thomas R. Hannon
(74) Attorney, Agent, or Firm—Greer, Burns & Crain, LTD

(57) ABSTRACT

A bearing system for a turbocharger shaft includes two angular contact ball bearings mounted in the opposite ends of a lubricated rotatable elongated cylinder, which includes a radially extending flange at one end that cooperates with stationary housing portions and carries the thrust load of the rotor in both directions. The angular contact ball bearing on the turbine end (hot end) of the machine is provided with a radial spring between the outside of its outer race and the elongated cylinder, which prevents rotation of the outer race, but still allows axial movement of the outer race in the elongated cylinder due to axial expansion of the shaft when exposed to high temperature. The inner races of the ball bearings are separated by a spacer, which is clamped in place between the bearings when the rotor assembly lock nut is tightened. Thus, the inner race of the bearings and spacer rotate with the shaft as part of the rotating assembly.

15 Claims, 1 Drawing Sheet

BEARING SYSTEM FOR HIGH-SPEED ROTATING MACHINERY

CROSS REFERENCE

This application is a continuation-in-part of application Ser. No. 09/978,935, filed Oct. 16, 2001 abandoned.

FIELD OF THE INVENTION

This invention relates to bearing systems for machinery with shafts that rotate at high speeds and are exposed at one end to high temperatures, such as turbochargers used on internal combustion engines.

BACKGROUND OF THE INVENTION

Turbochargers for internal combustion engines have been widely used on both diesel and gasoline engines for many years. A great deal of effort was expended in the early years of turbocharger development to produce a bearing system that exhibited sufficient durability to make a small size turbocharger commercially viable. Early attempts to use ball bearings were unsuccessful in that sufficient durability could not be achieved. Furthermore, bearing systems for small turbochargers must be capable of mass production manufacturing methods, be low in cost, and easily serviced in the field.

Research and development tests during the 1960's resulted in the perfection of floating sleeve-bearing systems that were capable of suppressing the problems of shaft instability, had acceptable friction losses and achieved satisfactory durability when used on a variety of internal combustion engine turbochargers. Several of these successful bearing systems are illustrated in U.S. Pat. Nos. 3,056,634; 3,096,126; 3,390,926; 3,993,370; and 4,641,977. The bearings of the patents listed above generally solved the stability problem by using a free-floating bushing between the rotating shaft and its stationary supporting member which was adapted to provide a film of lubrication between its inner surface and the rotating shaft and also between its outer surface and the stationary supporting member. In these systems, the free-floating bushings were free to rotate, but at speeds only a fraction of the speed of the rotating shaft and were free to move radially in order to allow the rotating assembly to find and rotate about its center of mass. The inner and outer oil films provided the necessary lubrication to prevent wear and provided a cushion against vibration and shock loads.

In the sleeve bearing systems described above, it was necessary to provide a thrust bearing to sustain the axial loads imposed on the rotating assembly by the actions of the compressor and turbine wheels used in the turbochargers, and a collar was provided on the rotating shaft to bear against a stationary thrust member. However, the high rotational speed of the collar attached to the shaft resulted in a high thrust frictional loss which, in addition to the frictional losses of the sleeve bearings, resulted in a substantial total frictional loss for the complete bearing system.

Since it is advantageous to have a bearing system that has a high mechanical efficiency, the use of anti-friction bearings in high-speed machines such as turbochargers is advisable. U.S. Pat. No. 4,370,106 discloses a bearing system for a turbocharger rotor consisting of an anti-friction ball bearing at its compressor end and a sleeve bearing at its turbine end. In this system, both the anti-friction bearing and the sleeve bearing are mounted in a non-rotating elongated cylinder. The cylinder containing the ball and sleeve bearings is prevented from rotating by a square portion at the compressor end that engages stops in the stationary housing member. Lubricant is provided between the non-rotating cylinder and the supporting housing to provide damping for eccentric motion of the rotor due to residual imbalance. In this bearing system, however, the differential speed between the sleeve bearing and rotor is the very high rotative speed of the rotor. Since sleeve bearing frictional losses are proportional to the square of the differential rotating speed, this system has an inherent higher frictional loss than a full-floating sleeve bearing system. Also, since the non-rotating cylinder that contains the bearings must engage the stationary housing member, it carries the full thrust load of the rotor. The residual imbalance in the rotor forces the non-rotating cylinder to move orbitally, causing the mating surfaces to be subject to fretting. Thus a solid film lubricant must be placed between the mating surfaces to mitigate the fretting problem; however, this problem remains an inherent disadvantage with this type of non-rotating cylinder system and contributes to a limited service life in the field.

The fretting problem inherent with non-rotating systems that are allowed to move radially is solved in the bearing system disclosed in U.S. Pat. No. 4,641,977. In this bearing system, a ball bearing is mounted in an elongated cylinder that has a radially extending flange at one end. The elongated cylinder is free to move radially to a limited degree and free to rotate in the stationary supporting member. The radially extending flange engages the stationary housing to carry the thrust load of the rotor. However, since the elongated cylinder rotates at relatively low speeds, the thrust losses are minimal. In this bearing system, a full-floating sleeve bearing is located at the opposite end of the elongated cylinder to complete the bearing system for carrying the rotor. The frictional losses with this system are reduced due to the ball bearing and floating sleeve bearing; thus, the mechanical efficiency of the system is relatively high compared to prior bearing systems.

BRIEF SUMMARY OF THE INVENTION

The bearing system of this invention provides a reliable, stable, shock and vibration-resistant, highly efficient system that is insertable in the stationary housing as an assembly, thus permitting inexpensive manufacture and ease of replacement in the machines in which it is used.

This invention comprises a double ball-bearing system that includes two angular contact ball bearings, each of which is mounted in the opposite ends of a rotatable elongated cylinder, and each of which carries thrust in one direction only. The elongated cylinder includes a radially extending flange at one end that engages the stationary housing to carry the thrust load of the rotor in both directions. The elongated cylinder is supplied with a lubricant on its outer surface between it and the stationary housing. This outer lubricant film provides a shock and vibration cushion for the rotating assembly. The outer surface of the elongated rotatable cylinder is provided with a V-groove to accept lubricant under pressure, and two angular oil feed holes in the sides of the V-groove are used to direct lubricant toward each of the ball bearings. The angular contact ball bearing on the compressor end (cool end) of the machine is pressed into a bore in the elongated cylinder, and the angular contact ball bearing on the turbine end (hot end) of the machine is provided with a radial spring between the outside diameter of the bearing outer race and a bore in the elongated cylinder. This radial spring prevents rotation of the bearing outer race at the turbine end of the elongated cylinder in the cylinder bore, but still allows axial movement of the outer race in the bore due to axial expansion of the shaft when exposed to high temperature.

The inner races of the ball bearings are separated by a spacer, which is clamped in place between the bearings when the rotor assembly lock nut is tightened. Thus, the inner race of the bearings and spacer rotate with the shaft as part of the rotating assembly.

To accommodate the ultra high speed rotation of turbochargers, the ball bearings are preferably angular contact, full complement (cageless) bearings employing ceramic balls.

MORE DETAILED DESCRIPTION OF THE INVENTION

Figure 1:
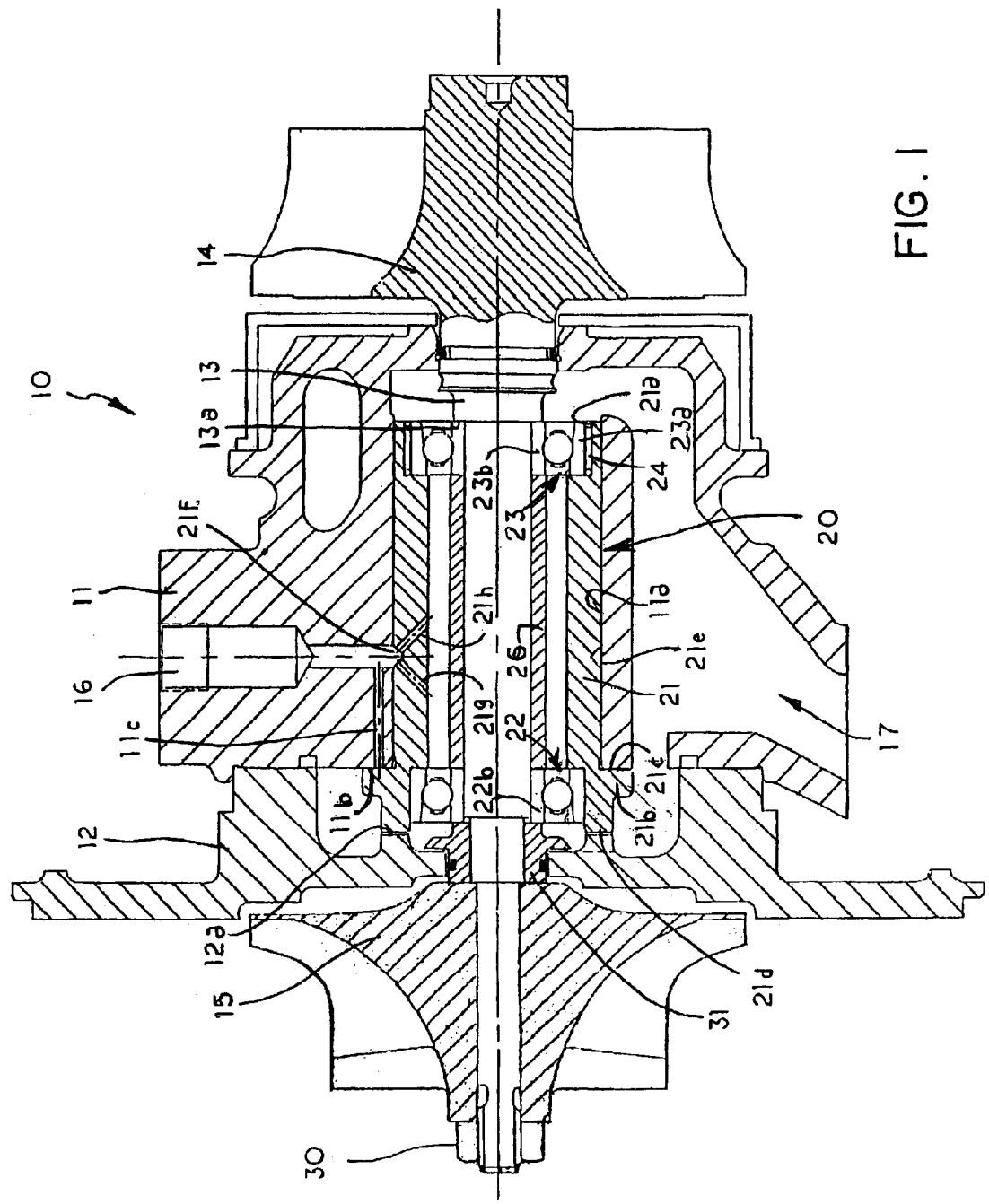
FIG. 1 is a cross-sectional view taken along a plane through the axis of rotation of a bearing system of this invention.

The bearing system of this invention is adapted to support, within stationary elements of a machine, a high-speed rotating shaft.

In a turbocharger 10, for example, stationary elements of the turbocharger, that is, the bearing housing 11 and end housing 12 encloses a rotating shaft 13 carrying a turbine wheel 14 at one end and a compressor wheel 15 at the other end. The bearing system 20 of the invention carries the rotating shaft 13 and is carried by the bearing housing 11. As well known in the art, the shafts of turbochargers have rotating speeds of 60,000 to 200,000 rpm and are exposed to the very high temperatures of engine exhaust gases at their turbine ends.

The bearing system 20 of this invention comprises an elongated rotatable cylinder 21 with one angular contact ball bearing 22 at its compressor end and another angular contact ball bear 23 at its turbine end. Angular contact ball bearings, as known in the art, are adapted to resist thrust in one axial direction, but not the other axial direction, and have high-speed capability.

One preferred embodiment of the invention comprises angular contact ball bearings of the full complement type using ceramic balls. Conventional ball bearings that use cages to separate the balls are limited in maximum speed because the cage must withstand centrifugal forces associated with the high speed of rotation. Many different cage designs are in use in conventional ball bearings depending on the speed range of the mechanical device in which they are employed. In ultra high speed machinery, such as turbochargers used on internal combustion engines, the maximum speed of the rotating assembly can reach or exceed 200,000 RPM. In order for ball bearings to sustain these high speeds successfully, it is advisable to eliminate the use of a cage to separate the balls. A full complement type of ball bearing does not employ a cage and the space between the inner and outer races is filled with balls, i.e., a full complement of balls, and, thus, is preferred for the bearing systems of the invention.

Another feature of this invention that allows the ball bearings to reach ultra high speed is the use of ceramic balls. The benefits of ceramic balls are higher temperature capability, a service life several times longer, and rotational speeds up to 50% higher than steel balls. The selection of ceramic balls for use in a turbocharger is thus preferred.

The combination of mounting an angular contact, full complement ball bearing, using ceramic balls, in each end of a rotatable cylinder and forming the bearing system of a high speed rotating machine is unique to this invention.

The bearing 22 at the compressor end of rotatable cylinder 21 has its outer race pressed into a bore at the compressor end of the cylinder 21. The ball bearing 23 at the turbine end of the rotatable cylinder 21 is provided with a radial spring 24 between its outer race 23a and a bore 21a in the end of elongated cylinder 21. Thus, in a turbocharger, the bearing system 20 locates one full complement angular contact ceramic ball bearing 22 adjacent the cool end, or compressor end, of the turbocharger and another full complement angular contact ceramic ball bearing 23 adjacent to the hot end, or turbine end of the turbocharger. The bearing 22 at the cool end carries the thrust load when it acts toward the turbine 14, whereas the bearing 23 at the hot end cares the thrust load when it acts toward the compressor 15. The radial spring 24, sometimes called a "tolerance ring," is located in the bore 21a of the rotatable cylinder 21 outside of the outer race 23a of turbine end ball bearing 23, prevents the outer race 23a from rotating in the cylinder bore 21a, but still allows the outer race 23a of the bearing 23 to move axially when the turbine end is exposed to hot exhaust gas temperatures.

The compressor end of rotatable cylinder 21 has an outwardly projecting flange 21b that forms a thust-bearng surface 21c, which is, preferably, perpendicular to the cylindrical outside surface 21e of rotatable cylinder 21, and cooperates with a thrust-bearing surface 11b of the bearing housing 11. The compressor end of rotatable cylinder 21 provides a second thrust-bearing surface 21d that cooperates with a thrust-bearing surface 12a of end housing 12. Thrust-bearing surfaces 11b, 21c and 12a, 21d provide lubricated thrust bearings for axial loads acting in both axial directions on the bearing system 20.

A nominal clearance, such as about 0.005 to about 0.010 cm, is provided between the outside diameter 21e of the rotatable cylinder 21 and the bearing housing bore 11a. Lubricant enters the bearing housing 11 at opening 16, usually from the internal combustion engine lubricating system and flows to one thrust surface 11b on the bearing housing 11 through a drilled hole 11c, in the bearing housing 11. Lubricant also flows into the clearance between the outside surface 21e of the rotatable cylinder 21 and bearing housing bore 11a, and into the peripheral V-groove 21f in the outside surface 21e of rotatable cylinder 21, and then through the two angular drilled holes 21g and 21h in the sides of the peripheral V-groove 21f. These holes 21g, 21h direct a flow of lubricant to each of the ball bearings 22 and 23. Instead of the two angular drilled holes 21g and 21h, a simple radial hole can be employed to direct lubricant from a simple circumferential groove in the outer peripheral surface of the elongated cylinder into the central bore to provide a flow of lubricant to each of the ball bearings 22 and 23. Lubricant flows through the turbine end ball bearing 23 and on into the oil drain cavity 17. Lubricant flows through the compressor end ball bearing 22, outwardly between the thrust surface 21d and thrust surface 12a on the end housing 12, and into the drain cavity 17. Spacer 26 is located between the inner races 22b, 23b of bearings 22 and 23, and is clamped in place by the axial force presented by tightening the rotor lock nut 30. The axial force exerted by tightening the locknut 30 clamps the compressor wheel 15, finger sleeve 31, the inner race of ball bearing 22b, spacer 26, and the inner race 23b of ball bearing 23 tightly against shoulder 13a on the shaft 13, thus forming the completed rotor assembly.

As shown in FIG. 1, the bearing system assembly 20 of the invention consists of the rotatable cylinder 21, angular contact, full complement, ceramic ball bearings 22 and 23, spacer 26, and radial spring 24. The bearing system 20 may be easily inserted into the bearing housing bore 11*a* when the compressor wheel 15, end housing 12, and finger sleeve 31 are not in place, can accommodate axial thrust and expansion of the shaft due to high temperature, can provide the high efficiency associated with the use of ball bearings and provides improved bearing life.

The bearing system is free to move radially in response to imbalance in the rotating mass. In addition, the bearing system reduces the relative speeds of rotation between the rotating shaft and the bearing system components, and between the bearing system components and the stationary machine elements, thereby improving the running life of the bearing system. Thrust loads are taken at the cooler end of the machine while the rotating shaft is free to expand in response to its exposure to heat at the hot end of the machine. In the bearing system, the oil films cushion the rotating shaft against shock and vibration, provide adequate lubrication, carry away friction-generated heat from the bearing surfaces, and also tend to carry away heat carried down the shaft from the hot end of the machine. The rotatable cylinder of the bearing system may be manufactured from steel and adapted to rotate within the stationary machine elements of either cast aluminum or cast iron.

The bearing system of this invention thus provides a reliable, stable, shock- and vibration-resistant, highly efficient system that is insertable in the stationary housing as an assembly, thus permitting inexpensive manufacture and ease of replacement in the machines in which it is used.

While I have shown and described a preferred embodiment of the invention, other embodiments may be devised without departing from the spirit or scope of the following claims.

I claim:

1. A bearing system for a shaft rotating at high speeds about an axis of rotation, comprising:
   a rotatable cylinder having a cylindrical outside surface and a pair of thrust-bearing surfaces, and having a central bore; a first angular contact ball bearing in the central bore at one end of the rotatable cylinder and having an inner race, a plurality of ball bearings and having an outer race to accept thrust in one direction only; a second angular contact ball bearing in the central bore at the opposite end of the rotatable cylinder having an inner race, a plurality of ball bearings and an outer race to accept thrust only in the direction opposite said one direction; a radial spring between the outer race of said first angular contact ball bearing and the rotatable cylinder; and a spacer between the inner races of said angular contact ball bearings.

2. A bearing system as in claim 1, wherein an outwardly projecting annular flange at one end of the rotatable cylinder forms one of the pair of thrust-bearing surfaces and the adjacent end of the rotatable cylinder forms the other of the thrust-bearing surfaces.

3. A bearing system as in claim 2, wherein a stationary bearing housing carries the bearing system and provides a thrust bearing surface adjacent the thrust-bearing surface of the outwardly projecting flange of the rotatable cylinder, and an axial drilled hole is provided in the stationary bearing housing to direct a flow of lubricant to said one of the thrust-bearing surfaces of the radially extending flange on the rotatable cylinder.

4. A bearing system as in claim 3, wherein the rotatable cylinder coacts with the bearing housing, the plurality of ball bearings, and the thrust-bearing sure to rotate at a speed of less than about one third of the speed of the rotating shaft.

5. A bearing system as in claim 2, wherein an end housing encloses the bearing system at said one end and provides a thrust-bearing surface for the adjacent end of the rotatable cylinder.

6. A bearing system as in claim 1, wherein the rotatable cylinder contains a peripheral groove around its cylindrical outside surface to carry a flow of lubricant and has at least one hole in the peripheral groove to carry lubricant into the central bore.

7. A bearing system as in claim 1, wherein the rotatable cylinder contains a V-shaped groove around its cylindrical outside surface to carry a flow of lubricant, and has angular drilled holes in the V-shaped groove sides to direct oil in opposite directions toward the angular contact ball bearings.

8. A bearing system as in claim 1, wherein the angular contact ball bearings comprise full complement ball bearings.

9. A bearing system as in claim 1, wherein the plurality of ball bearings comprise ceramic balls.

10. A bearing system as in claim 1, wherein the angular contact ball bearings are full complement bearings with ceramic balls.

11. A bearing system for a shaft rotating at high speeds about an axis of rotation comprising:
    a rotatable cylinder having a central bore, a first angular contact ball bearing in the central bore at one end of the rotatable cylinder and having an inner race, a plurality of balls and an outer race to accept thrust in one direction, and a second angular contact ball bearing in the central bore at the opposite end of the rotatable cylinder having an inner race, a plurality of balls and an outer race to acct thrust in the direction opposite said one direction; said ball bearings comprising full complement bearings and said balls comprising ceramic balls.

12. A bearing system as in claim 1 including a stationary bearing housing carrying the bearing system, said cylinder being rotatably mounted in said housing and the shaft being rotatably mounted by said bearings in said cylinder, and means in the stationary bearing housing for directing a flow of lubricant between said cylinder and said housing.

13. A bearing system as in claim 12, wherein said cylinder has a pair of thrust bearing surfaces, and wherein an outwardly projecting annular flange adjacent one end of the rotatable cylinder forms one of the pair of thrust-bearing surfaces and the adjacent end of the rotatable cylinder forms the other of the thrust-bearing surfaces.

14. A bearing system as in claim 13, wherein the bearing housing provides a thrust bearing surface opposed to the thrust bearing surface on said flange, and wherein an end housing encloses the bearing system at said one end and provides a thrust-bearing surface opposed to the thrust bearing surface on the adjacent end of the rotatable cylinder.

15. A bearing system as in claim 14, wherein the rotatable cylinder coacts with said housings, said bearings, and said thrust-bearing surfaces to rotate at a speed of less than about one third the speed of the rotating shaft.

* * * * *